Patented May 17, 1927.

1,629,250

UNITED STATES PATENT OFFICE.

CHARLES BITTINGER, OF DUXBURY, MASSACHUSETTS.

PRODUCTION AND UTILIZATION OF DICHROIC INKS.

No Drawing. Application filed January 3, 1925. Serial No. 465.

My invention relates to the production and utilization of dichroic inks, pertaining particularly to processes for making such inks, and as a further step therein, to a process for using such inks.

It is very desirable to print in more than one color, but in all of the processes now before the public, so far as known, it is necessary to provide a plurality of presses and of impressions to obtain the desired multi-colored effect. Obviously it would be advantageous to be able to print in a plurality of colors with a single ink and by a single impression.

It is an object of my invention to provide a single ink capable of imparting a plurality of distinctly different color sensations, and to provide a process for making such an ink.

It is a further object of my invention to reduce the number of impressions necessary to print in two colors to a single impression.

In carrying out my invention a suitable amount of pigment of predetermined spectral characteristics is ground in a suitable vehicle or carrier to form an ink of predetermined spectral distribution or characteristics, such, for instance, as arsenate of copper or Paris green. This may be ground until thoroughly mixed.

A desired or suitable amount of an organic dye, having different but predetermined spectral characteristics, say, for instance, red, such as methyl violet is then thoroughly mixed with said ink, taking great care however, that it is neither ground nor rubbed in the course of the mixing.

An ink is thus produced in which the subjective spectral distribution is practically the same as that of the pigment alone. In the instant case, it would be green. The dye, although in the ink, does not affect the subjective visual effect of the ink, as its coloring factor is purely potential until subjected to physical stress as by being put under pressure, as by rubbing or grinding. However, when the ink is rubbed or ground, the dye seems to dissolve, or at least the ink undergoes some physical change whereby the dye dominates the pigment and imparts practically its own spectral characteristics to the ink. This is for the reason that the chroma or saturation of the dye is much stronger than the pigment, that is its coloring factor has much greater power, although as noted this is not apparent nor effective until brought out by the pressure or grinding.

It will be noted that great contrasts can be had in the color of the ink in its normal condition, as compared with the same ink after being subjected to some sort of pressure. Thus, in the illustration given the normally green ink evolved by my process can be turned into a red ink simply by a slight rubbing or grinding action on the ink.

It will be obvious that any combinations of colors may be used, or even what is popularly known as different shades of the same color, that is, of the same hue, but with different degrees of saturation or brightness. It being necessary only that with the initial colored mixture, a secondary mixture of greater chroma or saturation be used.

Many applications of this invention to the useful arts will occur to those skilled therein. For instance it could be used in connection with a printing press or in a printing process in which a desired part of an impression is subject to pressure before the ink has dried, or in which at desired intervals the presses themselves or some portions thereof are caused to exert pressure on desired portions of an inked element to change its color in the press. I have found that a particularly good application of the invention may be had in connection with the so-called "rotogravure" process. In this process a cylindrical plate is used. If this rotating plate is caused to dip into this dichroic ink the plate will be covered and the depressions on the face of the plate will be filled with ink. In its rotation the plate moves past a stationary blade which brushes against the plate to remove excess ink. The brushing or sweeping action thus effected, subjects the ink on the surface and in the shallower depressions on the plate to a grinding pressure, which as noted causes the ink thus treated to change in color. However, in the deeper depressions and lines on the plate the ink being much thicker is not subjected to such pressure, and therefore remains the same normal color it was when applied to the plate. As the plate completes its rotation it gives an impression to paper passing through, which impression will be in two contrasting colors. This is thought to be quite clear.

Other methods of utilizing this ink will occur to those skilled in the several arts, as noted.

It will thus be seen that with the use of but a single ink, on the same background, two distinct colors may be printed.

I claim as my invention:

1. A composition of matter susceptible to use as an ink or coloring matter composed of pigment and a dye so arranged in the composition that the initial visual sensation imparted by the composition is substantially the same as that imparted by the pigment alone, and capable of manipulation to form an arrangement such that the visual sensation imparted by the composition is substantially the same as that imparted by the dye alone.

2. A composition of matter for producing visual effects upon the eye when applied to a background, composed of a pigment and a dye, the composition partaking initially of the color of the pigment, but partaking of the color of the dye when subjected to pressure.

3. A composition of matter composed of pigment of a certain chroma or saturation and of a certain color, which is the initial color of the composition, and a dye of greater chroma or saturation than the pigment initially invisible to the eye, but capable of dominating the composition and imparting its color to the composition when stimulated.

4. A composition of matter capable of imparting a plurality of color sensations on a common background, comprising a primary and a secondary coloring means initially mixed without combining to impart the color of one means alone to the composition, and susceptible to combining to impart to the composition substantially the color of the other means when suitably stimulated.

5. A composition of matter for use as an ink or coloring element comprising a plurality of combinable coloring means, initially mixed without combining and so arranged that the color sensation derived from the composition is substantially the color of one of said means, and further so that the means may be combined by stimulation whereby the color sensation derived from the composition is substantially the same as another means.

6. A dichroic ink composed of pigment of a color initially imparting its color to the ink, and of dye of a contrasting color, capable of imparting its color to the ink when physically stressed.

7. The method of producing dichroic ink that consists in mixing pigment of a predetermined spectral distribution with a vehicle and thoroughly stirring said mixture, then adding a desired amount of a dye of a different predetermined spectral distribution and mixing it therewith without rubbing or grinding.

8. The method of producing and utilizing dichroic ink that consists in mixing a desired amount of pigment with a carrier or vehicle, then mixing therewith a desired amount of dye of a different spectral distribution without rubbing or grinding, producing an ink partaking of the spectral characteristics of the pigment only, then subjecting desired portions of such ink to rubbing or grinding so that the portions so rubbed or ground partake of the spectral characteristics of the dye only.

9. The process of producing color effects including the step of applying to the background a composition embodying a dye and a pigment, which is capable of changing its color under manipulation, and manipulating the composition to produce such a color change.

10. The process of producing spectral visual effects including the step of the production of a composition embodying a dye and a pigment, which is capable of changing its spectral visual effect under manipulation, and manipulating the composition to produce such a change in spectral visual effect.

In testimony whereof I affix my signature.

CHARLES BITTINGER.